(12) United States Patent
Musuvathi et al.

(10) Patent No.: US 10,067,989 B2
(45) Date of Patent: Sep. 4, 2018

(54) TECHNOLOGIES FOR MINING TEMPORAL PATTERNS IN BIG DATA

(71) Applicant: Microsoft Technology Licensing, LLC, Redmond, WA (US)

(72) Inventors: Madanlal Musuvathi, Redmond, WA (US); Todd D. Mytkowicz, Redmond, WA (US); Veselin Raychev, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 14/689,716

(22) Filed: Apr. 17, 2015

(65) Prior Publication Data

US 2016/0306859 A1 Oct. 20, 2016

(51) Int. Cl.
*G06F 7/00* (2006.01)
*G06F 17/30* (2006.01)

(52) U.S. Cl.
CPC .... *G06F 17/30539* (2013.01); *G06F 17/3023* (2013.01); *G06F 17/30445* (2013.01); *G06F 17/30551* (2013.01)

(58) Field of Classification Search
None
See application file for complete search history.

(56) References Cited

U.S. PATENT DOCUMENTS

| 7,185,323 | B2 | 2/2007 | Nair et al. | |
|---|---|---|---|---|
| 7,464,247 | B2* | 12/2008 | Uppala | G06F 17/30575 707/999.101 |
| 2009/0198475 | A1* | 8/2009 | Sato | G06Q 10/10 702/188 |
| 2010/0332540 | A1* | 12/2010 | Moerchen | G06F 11/008 707/776 |
| 2013/0179413 | A1* | 7/2013 | Beirami | H03M 7/30 707/693 |
| 2013/0232476 | A1* | 9/2013 | Varma | G06F 8/443 717/150 |
| 2013/0311509 | A1* | 11/2013 | Sorkin | G06F 17/30946 707/769 |
| 2014/0358972 | A1* | 12/2014 | Guarrieri | G06F 17/30289 707/781 |
| 2015/0294002 | A1* | 10/2015 | Corbett | G06F 17/30442 707/693 |

OTHER PUBLICATIONS

Bacon et al., "Compiler Transformations for High-Performance Computing," In Journal of ACM Computing Surveys, vol. 26, Issue 4, Dec. 1, 1994, pp. 346-420. 76 pages.
(Continued)

*Primary Examiner* — Tuan A Pham
(74) *Attorney, Agent, or Firm* — Drinker Biddle & Reath LLP

(57) ABSTRACT

Concepts and technologies are described herein providing technologies for mining patterns in temporal data streams. Data is broken into data sub-portions. Dependencies in computation between one or more of the data sub-portions are broken using symbolic data types. Symbolic summaries of computations of sub-portions are performed in parallel and are reduced to generate an output.

20 Claims, 7 Drawing Sheets

(56) References Cited

OTHER PUBLICATIONS

Blelloch, "Prefix sums and their applications," In Proceedings of Sythesis of Parallel Algorithms, Retrieved on: Jan. 6, 2015, 26 pages.
Blumofe et al., "Cilk: An Efficient Multithreaded Runtime System," In Proceedings of Fifth ACM SIGPLAN Symposium on Principles and Practice of Parallel Programming, Jul. 19, 1995, pp. 207-216.
Bocchino et al., "A Type and Effect System for Deterministic Parallel Java," In Proceedings of 24th ACM SIGPLAN Conference on Object Oriented Programming Systems Languages and Applications, Oct. 26, 2009, pp. 97-116.
Bridges et al., "Revisiting the Sequential Programming Model for Multi-Corre," In Proceedcings of the 40th Annual IEEE/ACM International Symposium on Mmicroarchitecture, Dec. 1, 2007, 13 pages.
Chambers et al., "FlumeJava: Easy, Efficient data-parallel pipelines," In Proceedings of ACM SIGPLAN Conference on Programming Language Design and Implementation, Jun. 5, 2010, pp. 363-375., 13 pages.
Chandramouli et al., "Trill: A High-Performance incremental query processor for diverse analytics," In Proceedings of 41st International Conference on Very Large Data Bases, Retrieved on: Jan. 6, 2015, 12 Pages.
Colohan et al., "Optimistic Intra-Transaction Parallelism on Chip Multiprocessors," In Proceedings of 31st Very Large Data Bases Conference, Aug. 30, 2005, 12 Pages.
"Controlling Parallelism at the Session Level", Published on: Dec. 30, 2014 Available at: http://infocenter.sybase.com/help/index.jsp?topic=/com.sybase.infocenter.dc00743.1502/html/queryprocessing/CHDCBGCJ.htm, 2 pages.
Dean et al., "MapReduce: Simplified data processing on large clusters," In Proceedings of Communications of the ACM, vol. 51, Issue 1, Jan. 1, 2008, pp. 107-113. 7 pages.
Denaro, G., "All-Values Symbolic Execution," In Proceeding of 7th International Workshop on Automation of Software Test, Jun. 2, 2012, 7 pages.
Friedman et al., "SQL/MapReduce: A practical approach to self-describing, polymorphic, and parallelizable user-defined functions," In Proceedings of 35th International Conference on Very Large Data Bases, Aug. 24, 2009, 12 Pages.
Frigo et al., "Reducers and other Cilk++ hyperobjects," In Proceedings of Twenty-First Annual Symposium on Parallelism in Algorithms and Architectures, Aug. 11, 2009, pp. 79-90. 12 pages.
"Hadoop", Published on: Dec. 12, 2014, Available at: http://hadoop.apache.org/, 5 pages.
Hall et al., "Detecting coarse-grain parallelism using an interprocedural parallelizing compiler," In Proceedings of the IEEE/ACM Supercomputing Conference, Dec. 8, 1995, 64 pages.
Hillis et al., "Data Parallel Algorithms," In Proceedings of Communications of the ACM—Special Issue on Parallelism, , vol. 29, Issue 1, Dec. 1, 1986, pp. 1170-1183. 14 pages.
"How Parallel Execution Works", Published on: Dec. 28, 2011, Available at: http://docs.oracle.com/cd/E11882_01/server.112/e25523/parallel002.htm, 29 pages.
Kogge, A parallel algorithum for the efficient solution of a general class of recurrence equations, In Proceedings of IEEE Transactions on Computers, vol. C-22, Issue 8, Aug. 1973, pp. 786-793. 8 pages.
Ladner et al., "Parallel Prefix Computation," In Journal of the ACM, vol. 27, Issue 4, Oct. 1, 1980, pp. 831-838. 8 pages.
Mehrara, Parallelizing Sequential Applications on commodity hardware using a low-cost software transactional memory, In Proceedings of ACM SIGPLAN Conference on Programming Language Design and Implementation, Jun. 15, 2009, pp. 166-176. 11 pages.
Melnik et al., "Dremel Interactive Analysis of web-scale datasets," In Proceedings of 36th International Conference on Very Large Data Bases, vol. 3, Issue 1-2, Sep. 13, 2010, pp. 330-339. 10 pages.
Mytkowicz et al., "Data-Parallel Finite-State Machines" In Proceedings of 19th International Conference on Architectural Support for Programming Languages and Operating Systems, Mar. 1, 2014, pp. 529-542. 13 pages.
Padua et al., "Advanced Compiler optimizations for supercomputers" Communications of the ACM, vol. 29, No. 12, Dec. 1986, 18 pages.
Pingali et al., "The Tao of parallelism in algorithms," In Proceedings of 32nd ACM SIGPLAN Conference on Programming Language Design and Implementation, Jun. 4, 2011, pp. 12-25. 14 pages.
Prabhu, Safe programmable speculative parallelism, In Proceedings of ACM SIGPLAN Conference on Programming Language Design and Implementation, Jun. 5, 2010, pp. 50-61.
Radoi et al., "Translating Imperative Code to MapReduce," In Proceedings of ACM International Conference on Object Oriented Programming Systems Languages & Applications, Oct. 15, 2014, pp. 909-927. 19 pages.
Ramalingam et al., "Programmable Speculative Parallelism," Published: Jan. 5, 2015, Available at: http://research.microsoft.com/en-us/projects/speculate/, 2 pages.
Raman et al., "Speculative Parallelization Using Software Multi-threaded Transactions," In Proceedings of Fifteenth Edition of Architectural Support for Programming Languages and Operating Systems, Mar. 13, 2010, pp. 65-76. 12 pages.
Rinard et al., "Commutativity Analysis: A New Analysis Technique for Parallelizing Compilers," ACM Transactions on Programming Language and Systems, vol. 19, No. 6, Nov. 1997, pp. 942-991, 50 pages.
Rinard et al., "The Design, Implementation, and Evaluation of Jade," ACM Transactions on Programming Languages and Systems, vol. 20, No. 3, May 1998, pp. 483-545, 63 pages.
Shen et al., "Visual Analysis of Massive Web Session Data," In Proceedings of IEEE Symposium on Large Data Analysis and Visualization, Oct. 14, 2012, pp. 65-72. 8 pages.
Vautier et al., "An Inductive Database for Mining Temporal Patterns in Event Sequences," In Proceedings of 19th International Joint Conference on Artificial Intelligence, Jul. 30, 2005, 13 Pages.
Yu et al., "DryadLINQ: A system for general-purpose distributed data-parallel computing using a high-level language," In Proceedings of 8th USENIX Conference on Operating Systems Design and Implementation, Dec. 8, 2008, 14 pages.
Zhai et al., "Mr. LDA: A Flexible Large Scale Topic Modeling Package using Variational Inference in MapReduce", In Proceedings of the 21st World Wide Web Conference, Apr. 16, 2012, 11 Pages.
Breternitz, et al., "Cloud Workload Analysis with SWAT", In IEEE 24th International Symposium on Computer Architecture and High Performance Computing, Oct. 24, 2012, pp. 92-99.
King, Andrew, "Distributed Parallel Symbolic Execution", In a Thesis Submitted in Partial Fulfillment of the Requirements for the Degree Master of Science, Kansas State University, Jul. 2009, 115 Pages.
"International Search Report & Written Opinion Issued in PCT Patent Application No. PCT/US2016/026282", dated Jul. 1, 2016, 12 Pages.
Xiao, et al., "Cybertron: Pushing the Limit on I/O Reduction in Data-Parallel Programs", In Proceedings of the ACM Sigplan Conference on Programming Language Design and Implementation, vol. 49, Issue 10, Oct. 15, 2014, pp. 895-908.

\* cited by examiner

TECHNOLOGIES FOR MINING TEMPORAL PATTERNS IN BIG DATA

BACKGROUND

With the growth of machine-generated data, mining data for relevant information can become increasingly challenging. In some systems, a cost-effective way to store large amounts of data can be in disk drives. However, these relatively slow disk drives can make data mining difficult. The access speeds (latency) associated with these relatively slow disk drives can increase the time necessary to mine data. The increased time can delay the output of the mining operation as well as the inability to utilize system resources that are being used for the data mining operation for other operations.

In an attempt to minimize latency issues inherent in using relatively slow disk drives, as well as other memory structures, some systems utilize input/output parallelism. For example, relatively large amounts of data may be stored simultaneously on multiple data storage devices. In another example, data in multiple storage devices may be accessed individually at the same time, with the computing output for each analysis sent to a central processing unit for final computing operations. Although input/output parallelism is used in a significant percentage of operating systems, its use may be limited based on the manner in which the data is stored as well as the type of data.

Temporal data (e.g. data associated with a time) is an example of a data type that may not be readily available for parallel operations. Temporal data typically includes dependencies within the data and from data to data. For example, the data may be a log file generated when a user accesses an online store to purchase an item. The user may perform some research, look at reviews, and then purchase the item. The data associated with each of those events may include a time component, e.g. when the user accessed the store, the time associated with the search process, and the like. The time associated with those events is related (dependent) on each other. Further, the user may be one of many users accessing the online store. Thus, the time component of the one user may also be related to, e.g. dependent, the other users.

A potential solution to alleviate the dependency and latency issues, as well as others not specifically mentioned herein, can be to reorganize data to enable efficient future computing operations such as data mining queries. For queries that are deemed important, users can build "one-off" or unique solutions tailored to a particular data mining operation. However, this approach does not readily provide for other data mining operations, and can actually preclude data mining operations if the arrangement of the data prevents proper query operation on the data. For example, the data may have been rearranged in a manner that facilitates a specific query, but the data may have been indexed in a manner that does not provide sufficient information to perform other queries.

It is with respect to these and other considerations that the disclosure made herein is presented.

SUMMARY

The following detailed description is directed to technologies for mining temporal patterns using parallel operations and symbolic execution. In various configurations, a data mining operation is initiated on data received from one or more data stores. The data is decomposed into data sub-portions (or chunks). Computations are performed symbolically in parallel on the data sub-portions, creating a session summary in symbolic form for each of the sessions. As used herein, parallel may include computations performed nearly or simultaneously using multiple processors, multiple computers, multiple state machines, and the like. The presently disclosed subject matter is not limited to any particular manner of conducting parallel computations. The summaries are thereafter composed to provide an output that may have been generated if the data were processed in a sequential manner, i.e. a sequential output.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure

DETAILED DESCRIPTION

Figure 1:
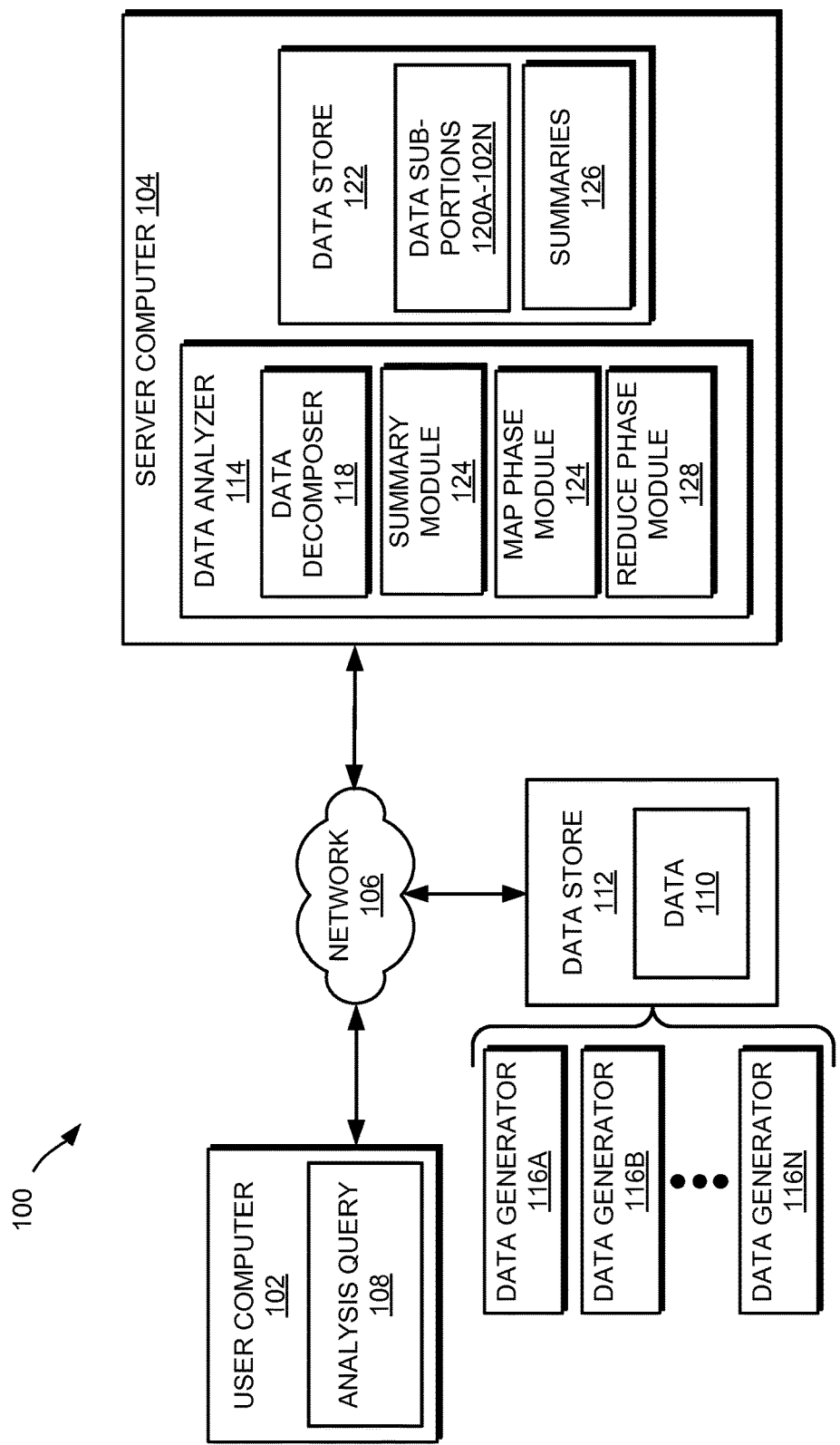
FIG. 1 is a system diagram showing one illustrative operating environment that may be used to implement various embodiments described herein.

Embodiments of the disclosure presented herein encompass technologies for mining temporal patterns using symbolic execution. In general, data is decomposed into data sub-parts. Because the data may include temporal information (or other types of information), the data sub-parts may have dependencies between themselves. For example, a time component in one data sub-part may be associated with data in another sub-part. When processing the data sub-parts in parallel, unless those dependencies are accounted for, the summaries calculated for the different data sub-parts may be incomplete or incorrect. Symbolic execution is used to account for possible dependencies among various data subparts.

Symbolic execution includes computation operations on data in a symbolic state as opposed to specific value calculation. In one example illustrating a difference between symbolic execution and value-based execution, data may be received where an output of a process is a numerical "8." The processes on that data may include input data of "2," an addition of "10" and a subtraction of "4," resulting in the output of "8". In this example, the output of "8" has meaning when the input value is known. In symbolic execution, however, the input value may be represented by a symbol, e.g. "y," rather than a known value, e.g. "2." If using the same operations described immediately above, the output using symbolic execution may be "y+6" rather than "8" as generated using value-based execution. Using symbolic execution, computational processes may be conducted on one or more data sub-parts in parallel even though the actual value of the input is not known. The various outputs (or summaries) of operations on the data sub-parts may thereafter be combined (or composed). The composition of the various data sub-parts allows a system to account for the dependencies to generate an output that would be generated if done in a sequential rather than parallel manner.

There may be various reasons why data is processed using constituent data sub-parts in parallel rather than on the whole data in a sequential manner. In relatively small sized data sets, sequential queries may be feasible. Sequential queries are queries in which a computation operation on a data set is completed before another computation operation is performed. In relatively small sized data sets, the time required to complete one computation operation before starting another computation operation may not be significant enough to preclude its use.

In one example, various examples of the presently disclosed subject matter may be used to analyze log data gathered by web servers. In some examples, the log data may include accesses to one or more websites monitored by the web servers. If the number of accesses is relatively significant or the number of websites being monitored is relatively large, the log data may be a relatively large data file. Analyzing the data may be desirable to determine access patterns (or purchasing patterns in some instances). In this example, however, access time and date information is often a component of the data. An analysis of the data, thus, would likely need to be performed in a sequential manner so that the time data is consistent throughout the analysis.

For example, the following sequential algorithm and update function may be used to analyze data associated with purchases made in an online store:

```
foreach event in clicklog
    session key = groupBy(event)
    update(state[key], event )
groupBy(event)
    return pair(event.user, event.item)
update(state, event)
    switch(state.ctrl)
        case nosrch:
            if(is_search(event)) {
                state.ctrl = srch;
                state.count = 0;
            }
        case srch:
            if(is_review(event)) state.count++
            if(is_purchase(event)) {
                output(state.count);
```

-continued

```
                state.ctrl = nosrch;
            }
```

The above query counts the number of reviews users read between a search for an item and a later purchase. The input to this query is a sequence of log entries from a web server in a timestamp order. The pattern involves a groupBy operation that groups the input sequence into logical sessions. Each session represents a customer's interaction with an item. Within a session, the query sequentially calls the update operation that waits for a search event and counts the review events (while skipping others). The operation continues until a purchase event is received.

The sequential nature of its operation may preclude its use on large sized data sets. In the example given above relating to online purchases, some online stores may handle several million transactions a day or a week. The amount of data generated, if mined using the function above in a sequential manner, may cause searches to last days or weeks depending on the capabilities of the particular system. Thus, while the output desired is sequential in nature, performing a sequential analysis may preclude attempts at doing so because of the potential size of the data being analyzed. Thus, in some examples of the presently disclosed subject matter, parallel operations are used in which the data is broken into constituent parts, where the constituent parts are analyzed separately and, in some instances, in parallel. Doing some may decrease processing time, increase system efficiency, and allow for systems having relatively lower processing capabilities to be used to analyze relatively large data sets.

To provide for parallel operations in some systems, aspects of the presently disclosed subject matter specify groupBy-update queries and a runtime that can exploit intra-session parallelism. In some configurations, dependencies of the data are disconnected in the update function using symbolic execution. In some configurations, various implementations of the presently disclosed subject matter break data to be analyzed into sub-portions (or chunks). Computation operations on the portions of the data commence from a symbolic state. Thus, in lieu of computing actual inputs or values, symbolic values are assumed depending on the state of the particular machine.

In some examples, for one or more of the data portions of a larger set of data, a summary is computed for each data sub-part. The summary captures possible final states for possible start states. A map phase computes these summaries in parallel and the reduce phase composes these summaries to determine a sequential output of the program. In some configurations, the use of symbolic execution to capture possible final states for possible start states can account for dependencies when the reduce phase is performed.

In some examples, the summaries generated prior to the composition operation may need to have a high degree of preciseness to retain the sequential semantics and efficient to achieve parallel speedups. In some examples, symbolic execution may provide the level of preciseness to enable parallel execution, resulting in faster processing of data over what may be achieved using sequential processing methods.

In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 is system diagram showing one illustrative operating environment 100 that may be used to implement various embodiments described herein. The operating environment 100 may include a user computer 102 and a server computer 104. The user computer 102 and/or the server computer 104 are not limited to any particular type or configuration of computing platform. Further, the user computer 102 and/or the server computer 104 may be one or more computing devices that, when implemented together, may be used as a user computer 102 and/or a server computer 104.

The user computer 102 may be placed in communication with the server computer 104 using a network 106. FIG. 1 illustrates one user computer 102, one network 106, and one server computer 104. It should be understood, however, that some implementations of the operating environment 100 include multiple user computers 102, multiple networks 106, and/or multiple server computers 104. The illustrated examples described above and shown in FIG. 1 should be understood as being illustrative, and should not be construed as being limiting in any way. It should be understood that the concepts and technologies disclosed herein are not limited to an operating environment 100 connected to a network or any external computing system, as various embodiments of the concepts and technologies disclosed herein can be implemented locally on the user computer 102 and/or the server computer 104.

The user computer 102 may be configured to generate an analysis query 108 to be applied to data 110 stored in a data store 112. The analysis query 108 may be a query comprising instructions or parameters that, when executed upon, provide some output. In one example, the analysis query 108 may include a parameter used to determine buying patterns of various consumers. It should be understood that various examples of the presently disclosed subject matter are not limited to a single data 110 stored in a single data store 112. For example, the data 110 may be multiple data 110 stored in multiple data stores 112 that collectively form the data 110.

The analysis query 108 may be received by an input from a user (not shown) or may be generated from various other sources, such as the user computer 102, or combinations thereof. For example, the user computer 102 may be configured to generate the analysis query 108 using various factors such as time, the occurrence of various events, and the like. The presently disclosed subject matter is not limited to any particular manner in which the analysis query 108 is generated.

The server computer 104 may receive the analysis query 108. The server computer 104 may invoke a data analyzer 114. The data analyzer 114 may be configured to perform various functions. When the analysis query 108 is received at the data analyzer 114, the data analyzer 114 may query the data store 112 for the data 110 to perform an action requested of the analysis query 108. The data store 112 may retrieve the data 110 and provide the data 110 to the data analyzer 114.

In some examples, the data 110 may be provided by various data generators 116A-116N (hereinafter referred to collectively and/or generically as "the data generators 116" and individually as "the data generator 116A," "the data generator 116B," "the data generator 116N," and the like). The data generators 116 may be various types of devices that generate data. In some examples, one or more of the data generators 116 may be servers that record accesses to an Internet web site (web log servers). The presently disclosed subject matter is not limited to any particular type of device for the data generators 116.

Once the data analyzer 114 receives the data 110, the data analyzer 114 may initiate a data decomposer 118. The data decomposer 118 may receive the data 110 and decompose (or separate) the data 110 into data sub-portions 120A-120N (hereinafter referred to collectively and/or generically as "the data sub-portions 120" and individually as "the data sub-portion 120A," "the data sub-portion 120B," "the data sub-portion 120N," and the like) and store the data sub-portions 120 in the data store 122. The data sub-portions 120 collectively comprise the data 110.

In some examples, the data 110 may be decomposed into equivalent sized data sub-portions 120. In other examples, the data 110 may be decomposed into the data sub-portions 120 based on the relation of the data sub-portions 120 to a particular one or more of the data generators 116. The presently disclosed subject matter is not limited to any particular manner in which the data 110 is decomposed into the data sub-portions 120.

In some configurations, the data sub-portions 120 may have dependencies within the data sub-portions 120. For example, one or more of the data sub-portions 120 may be temporally related (such as time, date, and the like). The data 110 and its constituent data sub-portions 120 may be organized according to the temporal data point in one or more of the data sub-portions 120. The data sub-portions 120 may have other types of dependencies. In another example, the data sub-portion 120A and the data sub-portion 120N may be accesses of an online store by a certain user. To organize the data 110, the dependency of the two data sub-portions 120A and 120N may need to be accounted for, thus creating a dependency between the data sub-portions 120A and 120N.

To account for the dependencies between one or more of the data sub-portions 120, various aspects of the presently disclosed subject matter may use symbolic execution. As explained above, symbolic execution includes computation operations on data in a symbolic state rather than a specific value. To perform operations in a symbolic state, a summary module 124 is invoked. The summary module 124, during a map phase operation, computes summaries 126 of final states for possible start states of one or more of the data sub-portions 120. In some examples, all possible final states for all possible start states of each of the data sub-portions 120 are computed.

In some configurations, the use of symbolic execution to capture possible final states for possible start states can account for dependencies when the reduce phase is performed. In an example, a summary of the data sub-portion 120A may be "$x+2=8$," a summary of the data sub-portion 120B may be "$y+x=4$," a summary of the data sub-portion 120C may be "$x \neq 0$" and a summary of the data sub-portion 120D may be "$y \neq 0$." As noted above, the summaries 126 of the data sub-portions 120 may be calculated in parallel. As noted above, the presently disclosed subject matter is not limited to any particular manner of parallelism. Although one user computer 102 and one server computer 104 are illustrated, operations may be performed using multiple user computers 102, multiple server computers 104, or multiple resources within either one of the user computer 102 and/or server computer 104.

Thus, information needed to determine a value in one of the data sub-portions 120 may be found in another of the data sub-portions 120. When viewed separately, the summaries 126 of data sub-portions 120A and 120B may represent indeterminate values. To determine an output, a reduce phase module 128 may be invoked. The reduce phase module 128 composes (or combines) the summaries 126 to determine a sequential output of the data 110. For example, continuing with the process described immediately above, when the summaries 126 are combined, the values of "x=6" and "y=(−2)" may be calculated as the output.

Figure 2:
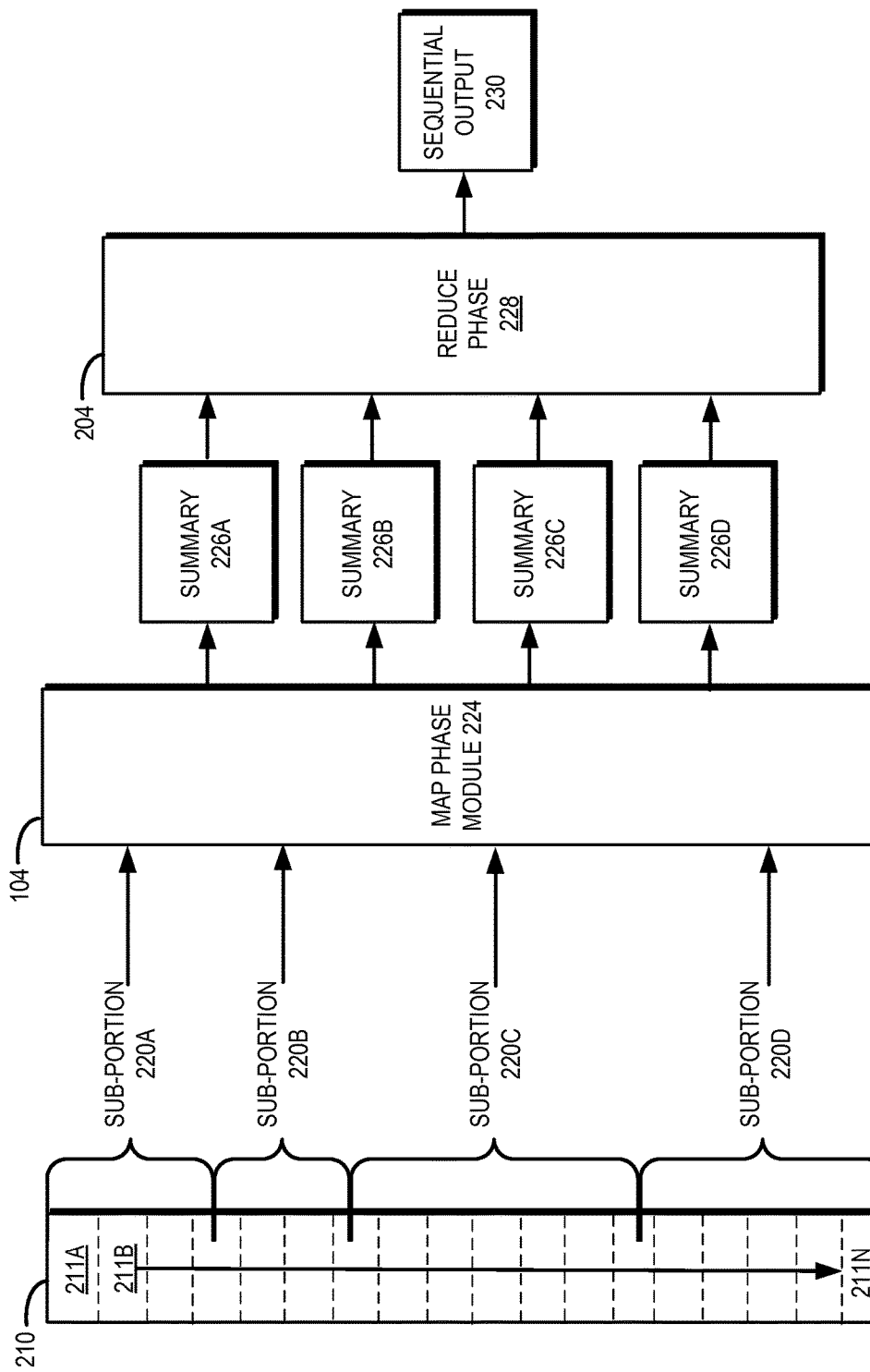
FIG. 2 is a graphical representation showing a symbolic execution process used to break, and then account for, dependencies in data for data mining operations to allow parallel computing operations.

FIG. 2 is a graphical representation showing a symbolic execution process used to account for dependencies in data for data mining operations, thus allowing parallel computing operations. Data 210 is illustrated in FIG. 2. The data 210 may be stored in one or more data stores such as the data store 112 of FIG. 1. The data 210 may be various types of data. The presently disclosed subject matter is not limited to any particular type or source of data. The data 210 may be comprised of data 211A-211N (collectively referred to herein as "the data 211" and individually as "the data 211A," "the data 211B," and the like). For example, the data 211A may be log file entries for accesses to a web site. The data 211 may be generated by one or more web servers (not illustrated) and collected together in some manner to generate the data 211.

The data 211 may include dependencies among the data 211. For example, a data of the data parts 211 may be a temporal data point (such as time, date, and the like). The data 210 and its constituent data 211 may be organized according to the temporal data point in one or more of the data 211. Other dependencies may exist. The data 211 may be associated with each other in other manners. For example, the data 211A and 211N may be accesses of an online store by a certain user. To organize the data 210, the dependency of the two data 211A and 211N may need to be accounted for, thus creating a dependency between the data 211A and 211N.

The acceptance of an unknown input may provide the ability to break dependencies in the data 210. As mentioned above, input values may not always be known. Using a value-based computational process, dependencies among the data may not be known and accounted for unless the data 210 is analyzed in its complete form. However, the analysis of the entire data 210 to account for dependencies may prevent parallel operations on the data 210. In other words, to account for dependencies of the data 210, one or more analysis systems analyzing the data 210 may have to wait for another analysis system to finalize its analysis of the data 210 to commence its analysis.

To parallelize the analysis of the data 210, the presently disclosed subject matter may break the data 210 into data sub-portions, illustrated in FIG. 2 as data sub-portions 220A-220D. The portions may be whole or a portion of one or more of the data 210. A map phase module 224 may be invoked to perform operations on the data sub-portions 220A-220D by one or more computing systems, described in more detail below. The map phase module 224 computes summaries 226A-226D of the data sub-portions 220A-220D in parallel fashion. In some configurations, the map phase module 224 is designed to capture (or compute) possible final states for possible start states of state machines analyzing the data sub-portions 220A-220D. The summaries 226A-226D of the data sub-portions 220A-220D are then composed to determine a sequential output 230 of the program.

Various methodologies may be used in various implementations of the presently disclosed subject matter. For example, the summary 226A of the data sub-portion 220A may be a summary of a counter function. However, it may not be known whether or not the counter function of the summary 226A of the data sub-portion 220A is based on data only within the data sub-portion 220A. In other words, the counter function may also include data 211 from other data sub-portions 220B-220D. Thus, to allow for parallel operations by the map phase module 224, symbolic execution of the counter function may be used instead of an execution that generates an actual value. This process is explained in more detail in FIG. 3, below.

Figure 3:
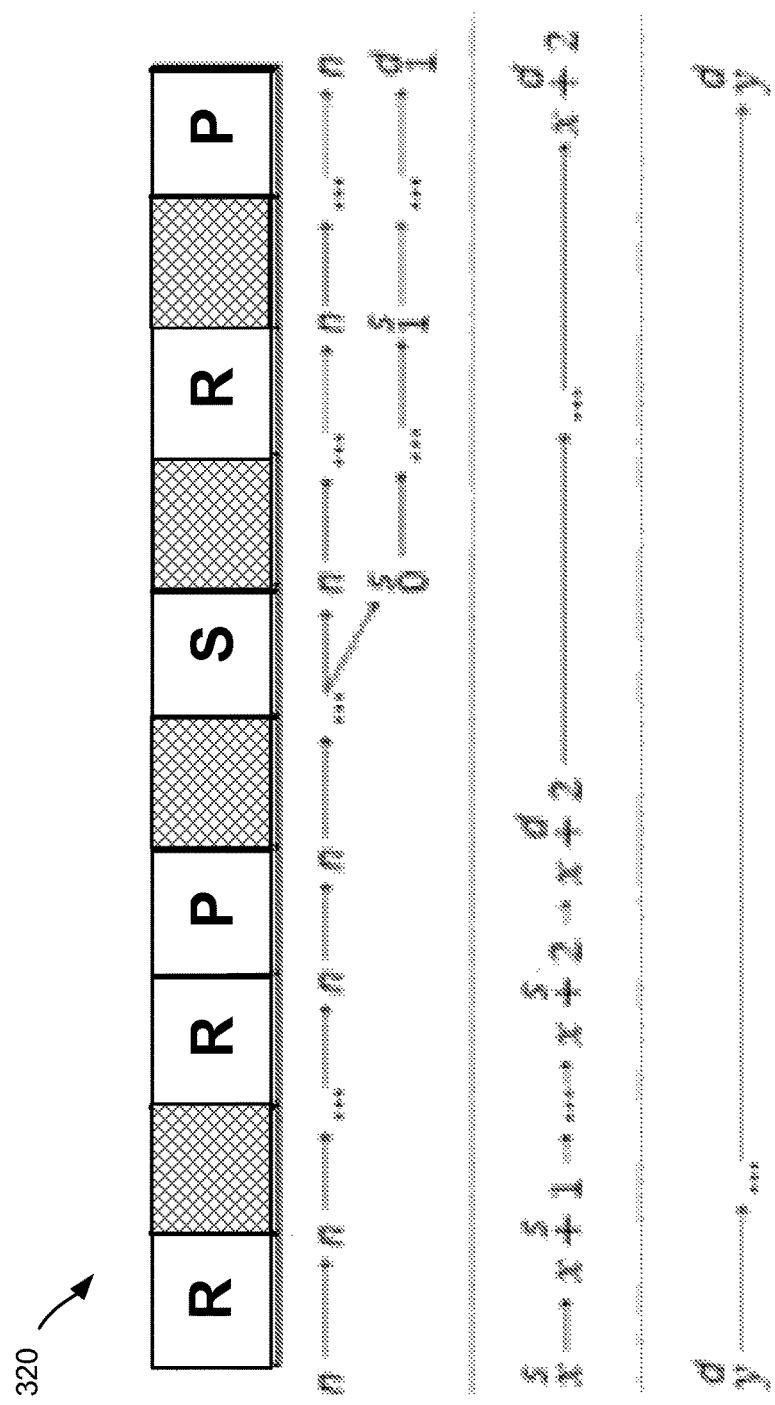
FIG. 3 illustrates operations on a portion of a large log file processed by a state machine.

FIG. 3 illustrates operations on a data sub-portion 320 of a large log file processed by a state machine. For example, the data sub-portion 320 illustrated in FIG. 3 may be one of the data sub-portions 220A-220D of FIG. 2. The log file relates to a user searching (S) for an item, reviewing (R) the item, and purchasing (P) the item. FIG. 3 shows search (S), review (R), and purchase (P) events belonging to a session. As used herein, a "session" refers to one or more events that generate the data sub-portion 320. For example, a session may be an access by a consumer on an Internet website to purchase a product. Cross-hatched regions are interspersed, which can represent events from other sessions that are included in the data sub-portion 320.

Each state machine (except a first one) depends on possible events that could have occurred before its portion of the input. For instance, when processing a review(R) event, a state machine might not know if a search(S) event for that session occurred in prior portions and if so, how many review(R) events occurred in those portions. To account for all such possible prefixes of the input, various aspects of the presently disclosed subject matter may start from a symbolic state and then compute a summary that captures possible final states for every start state.

These summaries may be computed in parallel. The summaries may be then composed to determine a sequential output of the operation. The sequential output can be defined to be the output if the data was processed in a sequential nature. In some examples, the summaries generated prior to the composition operation may need to have a high degree of preciseness to retain the sequential semantics and efficient to achieve parallel speedups.

FIG. 3 pictorially represents the computation of summaries for the update function described above. The control states are enumerated: nosrch(n), srch(s), and done(d). A symbolic count value is also enumerated and illustrated below the control state with either an "x" or a "y." The portion of data is processed while updating symbolic states. In one example, the following summaries are generated: n→{n; (d; 1)} denoting that if the portion was processed from the nosrch state, the update function will (nondeterministically) choose to count one review in the done state or stay in nosrch state; (s; x)→(d; x+2) denoting that when starting from srch state, the update function will increment the count by 2 to reach the done state; and (d; y)→(d; y) denoting that update function will retain previously measured counts. In a subsequent composition phase, these symbolic summaries are composed together to generate the set of done states at the end of the last portion. In one example, the set of done states can contain desired counts.

To provide for various functions, such as the update function described above, various examples of the presently disclosed subject matter may use a nondeterministic finite-state machine that is extended with symbolic data types, or an extended finite state machine (EFSM). An example is the counter used in the example above. These data types can enable expressive queries that users currently query on relatively large data. These data types can also increase the accuracy of the summaries as well as increase the efficiency in generating the summaries.

As used herein, a finite-state machine is a mathematical model of computation used to design both computer programs and sequential logic circuits. A finite-state machine is conceived as an abstract machine that can be in one of a finite number of states. The machine is in only one state at a time; the state it is in at any given time is called the current state. It can change from one state to another when initiated by a triggering event or condition, called a transition. A particular finite-state machine is defined by a list of its states, and the triggering condition for each transition.

To perform intra-session parallel processing, such as the operation performed in FIG. 3, two functions may be used. A first function is the groupBy function that splits a temporal data stream into a set of sessions and an update function that performs computations on individual sessions. The groupBy function expresses session-level parallelism. To perform intra-session parallelism, the dependencies in the update function may need to be broken up An EFSM is a classical nondeterministic finite-state machine extended with data types from an unbounded domain. Each transition of an EFSM depends on an updates both its state and the value of the data type. A data type consists of three components—a value, a set of operations that can be performed on the value, and a partial function that defines a new value for a data type when performing an operation. For example, a data type can be a tuple $T=(d_0, D, Ops, F)$, where D (the domain) and Ops (operations) are possibly infinite sets, $d_0 \in D$ is the initial value of T, and $F: D \times Ops \to D$ is a partial function that applies an operation in Ops to an element in D. For instance, $(0, Z, \{inc\}, F)$, where $F(x, inc)=x+1$ when $x<10$ and undefined otherwise, represents a counter data type that counts from 0 to 10.

If a data type is defined as above, an EFSM can be a tuple $M=(s_0, S, T, R, N)$, where S is a finite set of control states, $s_0 \in S$ is the start state, $T=(d_0, D, Ops, F)$ is a data type, R is a (possibly infinite) set of input records, and $N \subseteq S \times S \times P(R) \times (R \to Ops)$ is a finite set of transitions. A state of an EFSM can be a pair $(s, d) \in S \times Y$. A transition (src, dst, rule, oprule)$\in N$ is said to be enabled in state (s, d) on an input $r \in R$ if (a) rerule (i.e. the input record satisfies the rule) and (b) d'=F(d, oprule(r)) is defined. If enabled, this transition can change the state of the EFSM to (dst, d'). This computation may be denoted as (src, d) $\xrightarrow{r}$ (dst,d'). As an example, based on the input record, an EFSM might decide to either increment or decrement (as determined by oprule(r)) a counter in its state, but may only do so when the counter does not exceed some bounds (based on whether F(d, oprule(r)) is defined or not).

The EFSM can start in the initial state $(s_0, d_0) \in S \times D$. An EFSM computation $$(s_0, d_0) \xrightarrow{r_2, \ldots, r_n} (s_n, d_n)$$

can be defined recursively in a conventional manner if there exists $(s_1, d_1) \in S \times D$ such that $$(s_0, d_0) \xrightarrow{r_1} (s_0, d_0) \xrightarrow{r_2, \ldots, r_n} (s_n, d_n).$$

In some configurations, to perform a calculation using symbolic execution, all final states possible for a given sequence of input records may need to be calculated or determined. Due to nondeterminism, there can be many such final states. Therefore, in some configurations, certain restrictions can be used to allow multiple matches of the same pattern. Once the issue of nondeterminism is resolved, the rest of the function can deterministic.

For example, the following code may represent a sequential interpreter for an EFSM:

```
1   SeqEFSM((s_init, d_init), // start state
2                M = (s_0, S, T = (d_0, D, Ops, F), R, N), //EFSM
3                r_1 ... r_n) // input
4       states := {(s_init, d_init)}
5       for r_i ∈ r_1 ... r_n
6           next := { }
7           for (s, d) ∈ states and for (s, dst, rule, oprule) ∈ N
8               if r_i ∈ rule ∧ F(d, oprule(r_i)) is defined
9                   next := next ∪ (dst, F(d, oprule(r_i)))
10          states := next
11      return states
```

In some examples, various implementations can expose intra-session parallelism in the sequential computation in the above code by processing the sequence of input records in parallel. This can require breaking the loop-carried dependence of states across the for loop at line 5 of the above code. This may be applied to EFSMs. For example, two-way parallelism may be desired. An input sequent may be split into two sequences $r_1 \ldots r_p$ and $r_{p+1} \ldots r_n$. If $$(s_0, d_0) \xrightarrow{r_1 \ldots r_p} (s_p, d_p)$$

then $(s_p, d_p)$ is one of the possibly many start states for processing the second sequence. Rather than waiting for the first computation to generate all such states, the second computation can be performed for all possible start states while the first computation is occurring. As shown above, the computation on data types is performed symbolically. A data type used in symbolic execution may be defined as a symbolic data type.

A symbolic data type may be explained in the following example. Given a data type $T=(d_0, D, Ops, F)$, its symbolic variant may be $T^s=(d^s_0, D^s, Ops; F^s, apply)$, which may support the same set of operations but may start from a symbolic initial value $d^s_0$. Moreover, given a sequence of operations $o_1 \ldots o_n$, and for any $d \in D$, the functions $F^s$ and apply satisfy the following property. If $$d' = F(\ldots F(F(d, o_1), o_2) \ldots o_n)$$

$$d^s = F^s(\ldots F^s(F^s(d_0^s, o_1), o_2) \ldots o_n)$$

then $$d' = apply(d, d^s)$$

In other words, $d'^s$ is a partial evaluation of d' for the unknown initial value d, and apply provides for the ability to complete the evaluation once d is known. As a simple example, consider an integer data type that only supports the increment operation and an assignment operation. Given an unknown initial value x, the symbolic data type represents a value as a pair (a, b) denoting the symbolic expression $a \cdot x + b$, where $a \in \{0,1\}$. This data type starts with (1, 0) (representing x), increment operations increment b, while an assignment to v sets a to 0 and b to v. Given d, the apply operation returns $a \cdot d + b$. The interval data type in Section 3 extends this data type with additional predicates such as equality and comparison operations.

If the datatype of an EFSM has a symbolic variant, the following is an example interpreter that may be used for the EFSM.

```
1    Given:
2        M = (s_0, S,T = (d_0, D, Ops, F), R, N), // EFSM
3        T^s = (d_0^s, D^s, Ops, F^s), // symbolic variant of T
4        M^s = (s_0, S, T^s, R, N^s) // copy of M that uses T^s
5
6    Mapper(r_p . . . r_q) {
7        Φ = {} // Empty map of type S → P(S × D)
8        for s ∈ S // For every control state
9            φ[s] = SeqEFSM ((s, d_0^s), M^s, r_p . . . r_q)
10       return Φ }
11
12   Reducer (Φ_1 . . . Φ_n) {
13       X = {(s_0, d_0)}
14       for Φ in Φ_1 . . . Φ_n
15
         X = ⋃_{(s,d)∈X} { (s', apply(d, d')) |
                           (s', d') ∈ Φ[s] ∧ apply(d, d') is defined }
16
17       return X }
18
19   ParEFSM (r_1 . . . r_n)
20       return Reducer(map(Mapper, chunk (r_1 . . . r_n) ) )
```

The above interpreter partitions an input sequence into several contiguous chunks and calls a Mapper (line 20) on each chunk. As used herein, a "chunk" is a sub-portion such as the sub-portions 220 of FIG. 2. Each Mapper enumerates all control states and for each state, invokes a sequential algorithm, such as the sequential algorithm discussed above, with the symbolic initial value $d_0^s \in D^S$ (line 9). The Mapper satisfies the invariant that if $$(s, d) \xrightarrow{r_p, ..., r_n} (s', d'),$$

then there exists $(s',d'^s) \in \Phi[s]$ such that $d'=\text{apply}(d,d'^s)$. In effect, Φ[s] represents the symbolic summary of starting the EFSM from control state s. The Reducer function uses the apply function to stitch these symbolic summaries together. The data-parallel algorithm in can target many parallel backends, such as multicore and GPGPUs. However, in some applications, there may be tradeoffs. In some examples, the efficiency of a data-parallel algorithm can depends on: (a) the speed of computing the symbolic summaries, (b) the size of the summaries, and (c) the efficiency of the apply operation. In some applications, (a) can possibly be computationally intensive as functions such as Mappers are executed in parallel and are I/O bound. But (b) can directly control the amount of data exchanged between Mappers and Reducers and may need to be minimized. Finally, (c) can determine the sequential bottleneck in the Reducer and thus can be efficient. Some of the tradeoffs listed above can be partially overcome by expressing the update functions as an EFSM with an appropriate symbolic data type.

In some examples, symbolic data types that can be used include a write-only register, a predicate data type, and an integer with constraints. A write-only register is a data type that stores a value from a domain D and can only be written to in an EFSM computation. The only way to "see" the stored value is from the final states at the end of the computation. A predicate is a data type that stores a single value from its domain X, but allows an arbitrary set of predicates that compare a currently stored value with a new value and is defined only if the two values are accepted by a specified predicate.

The integer with constraints data type allows an EFSM to perform basic arithmetic on a single integer. A goal of the integer data type is to represent the current value of the data type y as a simple function of the initial symbolic value. The data types may be defined and used by combining them into tuples that can allow for efficient symbolic computation. In one example, the following may be inputted: a definition of the input records; a function to parse a record into a structure; predicates for the predicate data type that take two record structures and returns true or false; variable declarations statically typed with the existing symbolic data types; a function to print output from values stored in data types; and a groupBy function. It should be understood, however, that the presently disclosed subject matter is not limited to any particular data type.

Figure 4:
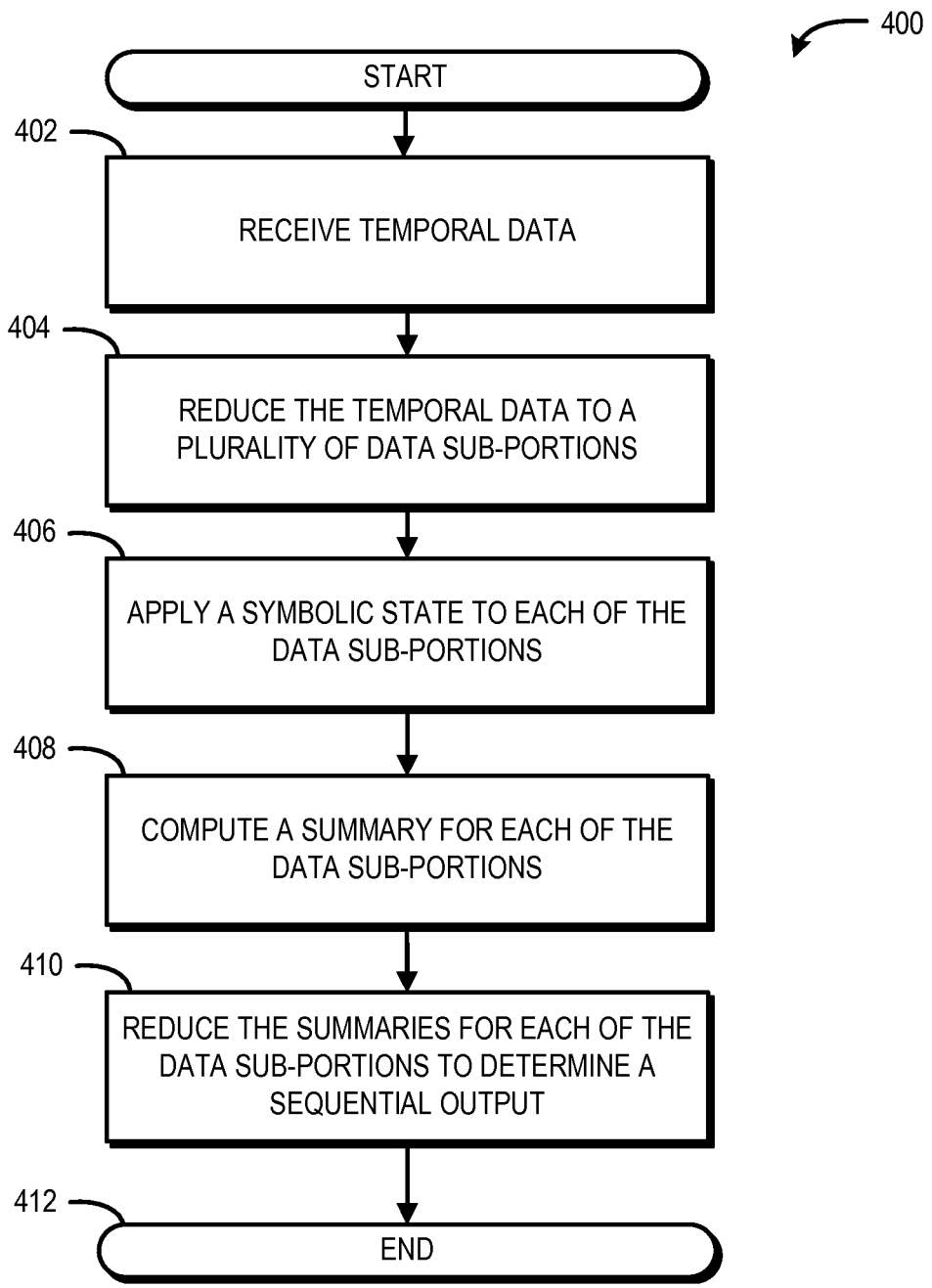
FIG. 4 is a flow diagram showing aspects of a method for mining temporal patterns, in accordance with some embodiments.

FIG. 4 is a flow diagram showing aspects of a method 400 for mining temporal patterns using parallel operations and symbolic execution, in accordance with some embodiments. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The operations of the method 400 are described herein below as being implemented, at least in part, by a computing device 700 (described below with regard to FIG. 7). One or more of the operations of the method 400 may alternatively or additionally be implemented, at least in part, by the similar components in either computing device 700 or a similarly configured server computer providing the operating environment 100.

Now with reference to FIG. 4, the method 400 begins and proceeds to operation 402, where temporal data is received, such as the data 100. The data 110 may be received by the server computer 104 as a result of the analysis query 108. The analysis query 108 may be generated for various reasons, including user input.

The data 110 may include temporal (or time-related) information in the data 110. The data 110 may be comprised of data 211 that form the data 110. The data 211 may include dependencies amongst the 211. The dependencies may be a result of information in one data 211 being necessary to understand the information in another data 211. If the dependencies are not accounted for, operations on a portion of the data 210 may result in errors.

The method 400 proceeds from operation 402 to operation 404, where the temporal data, such as the data 110 of FIG. 1, is reduced into a plurality of data sub-portions, such as the data sub-portions 220 of FIG. 2. The data 110 may be separated into the data sub-portions 220 using various methods or techniques. In some configurations, the data 110 is broken into the data sub-portions 220 by file size (e.g. the data sub-portions are as close to possible the same file size). In another configuration, the data 110 is broken into the data sub-portions 220 based on an identification of a session. For example, each of the data 211 may be accesses of a website by one or more individuals. The data 110 may be broken into the data sub-portions 220 whereby the data sub-portions represent an individual session.

The method 400 proceeds from operation 404 to operation 406, where a symbolic state is applied to each of the data sub-portions. As described above, operations on the data sub-portions 220 may be performed symbolically rather than value-based. By performing the operations in a symbolic state, dependencies between the data 211 may be accounted for.

The method 400 proceeds from operation 406 to operation 408, where a summary is computed for each of the data sub-portions 220. The summaries may, in some examples, be generated by accounting for all possible start states and all possible final states of an operation on a data sub-portion 220. By calculating all possible start states and all possible final states, dependencies may be accounted for in a subsequent composition operation. In one example, the dependencies are accounted for because, once composed, only specific summaries may make mathematical sense when placed together. For example, an end state of a process on one data sub-portion 220 may only compute correctly if paired with a specific start state of another data sub-portion. The correct pairs of start/final states, when composed, provide an output.

The method 400 proceeds from operation 408 to operation 410, where the summaries of each of the data sub-portions are reduced to determine a sequential output. As mentioned above, by computing all possible start states and all possible final states symbolically, when composed, only specific start states and final states will provide a proper output The method 400 thereafter ends at operation 412.

Figure 5:
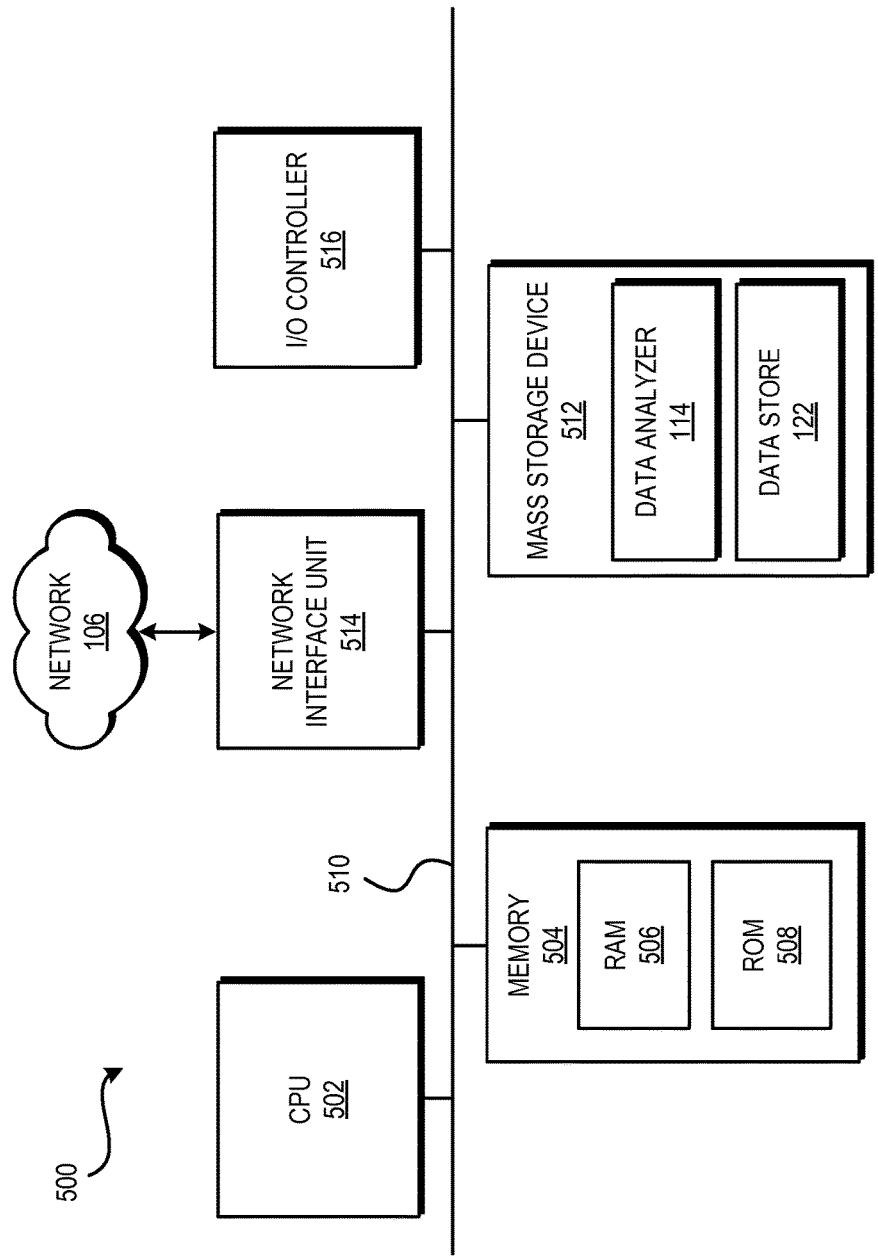
FIG. 5 illustrates an illustrative computer architecture for a device capable of executing the software components described herein to mine temporal patterns using parallel operations and symbolic execution, in accordance with some embodiments.

FIG. 5 illustrates an illustrative computer architecture 500 for a device capable of executing the software components described herein to mine temporal patterns using parallel operations and symbolic execution. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the data analyzer 114 and for providing other components such as the data store 122.

The mass storage device 512 is communicatively connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 106. The computer architecture 500 may connect to the network 106 through a network interface unit 514 connected to the bus 510. It should be appreciated that the network interface unit 514 also may be utilized to connect to other types of networks and remote computer systems, for example, the data store 112. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
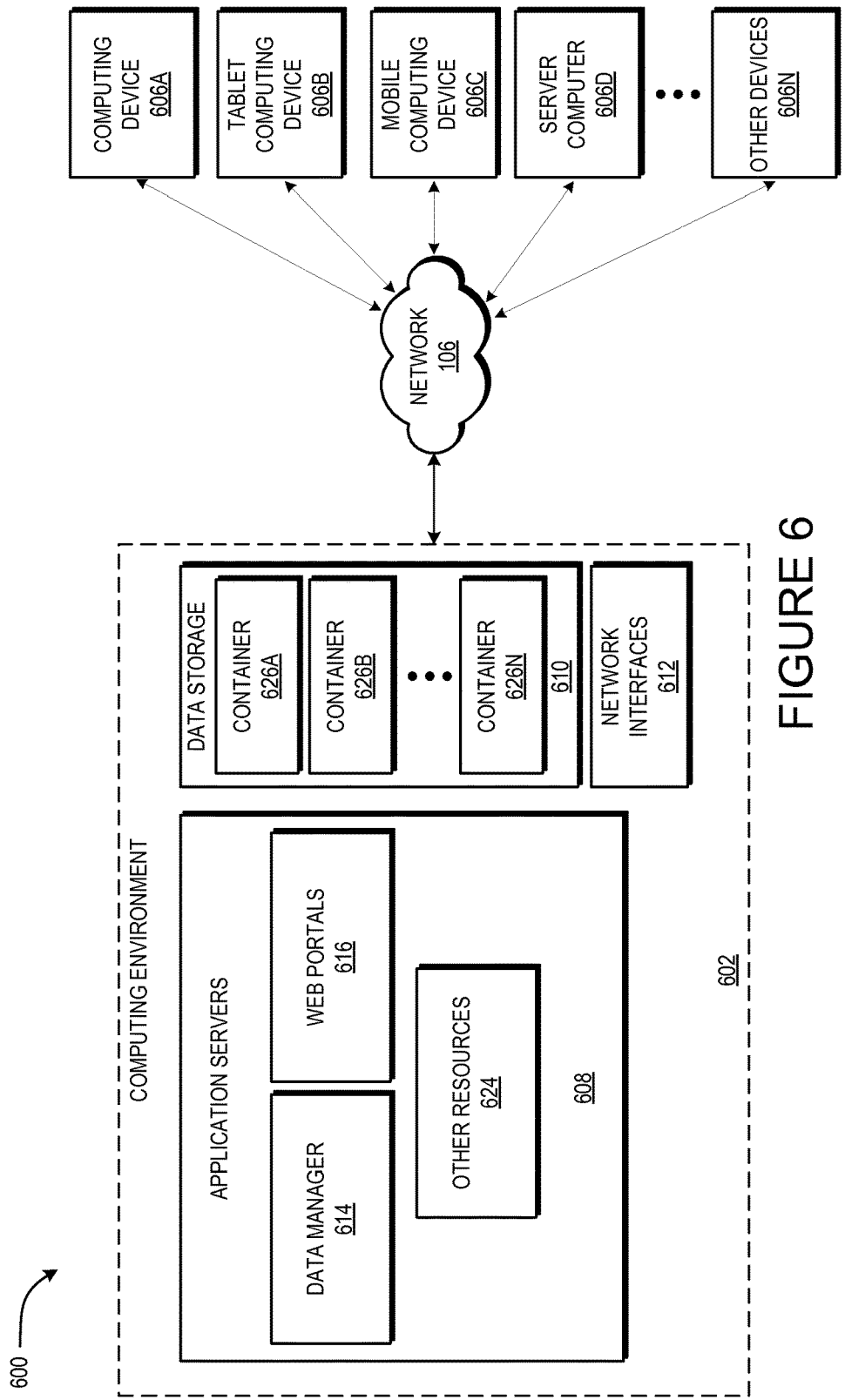
FIG. 6 illustrates an illustrative distributed computing environment 800 capable of executing the software components described herein mine temporal patterns using parallel operations and symbolic execution, in accordance with some embodiments.

FIG. 6 illustrates an illustrative distributed computing environment 800 capable of executing the software components described herein mine temporal patterns using parallel operations and symbolic execution, in accordance with some embodiments. Thus, the distributed computing environment 600 illustrated in FIG. 6 can be used to provide the functionality described herein with respect to the user computer 102 and/or the server computer 104. The distributed computing environment 600 thus may be utilized to execute any aspects of the software components presented herein.

According to various implementations, the distributed computing environment 600 includes a computing environment 602 operating on, in communication with, or as part of the network 106. The network 106 also can include various access networks. One or more client devices 606A-606N (hereinafter referred to collectively and/or generically as "clients 606") can communicate with the computing environment 602 via the network 106 and/or other connections (not illustrated in FIG. 6). In the illustrated embodiment, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. It should be understood that the illustrated clients 606 and computing architectures illustrated and described herein are illustrative, and should not be construed as being limited in any way.

In the illustrated embodiment, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated embodiment, the application servers 608 host one or more virtual machines 614 for hosting applications or other functionality. According to various implementations, the virtual machines 614 host one or more applications and/or software modules for providing the functionality described herein for mining temporal patterns in data. It should be understood that this embodiment is illustrative, and should not be construed as being limiting in any way. The application servers 608 also host or provide access to one or more Web portals, link pages, Web sites, and/or other information ("Web portals") 616.

As shown in FIG. 6, the application servers 608 also can host other services, applications, portals, and/or other resources ("other resources") 624. It thus can be appreciated that the computing environment 602 can provide integration of the concepts and technologies disclosed herein provided herein for mining temporal patterns using parallel operations and symbolic execution. For example, the concepts and technologies disclosed herein can be used to mine temporal patterns using parallel operations and symbolic execution to generate consumable content embodying that data. It should be understood that these embodiments are illustrative, and should not be construed as being limiting in any way.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 600 to utilize the functionality described herein for mining temporal patterns using parallel operations and symbolic execution.

Figure 7:
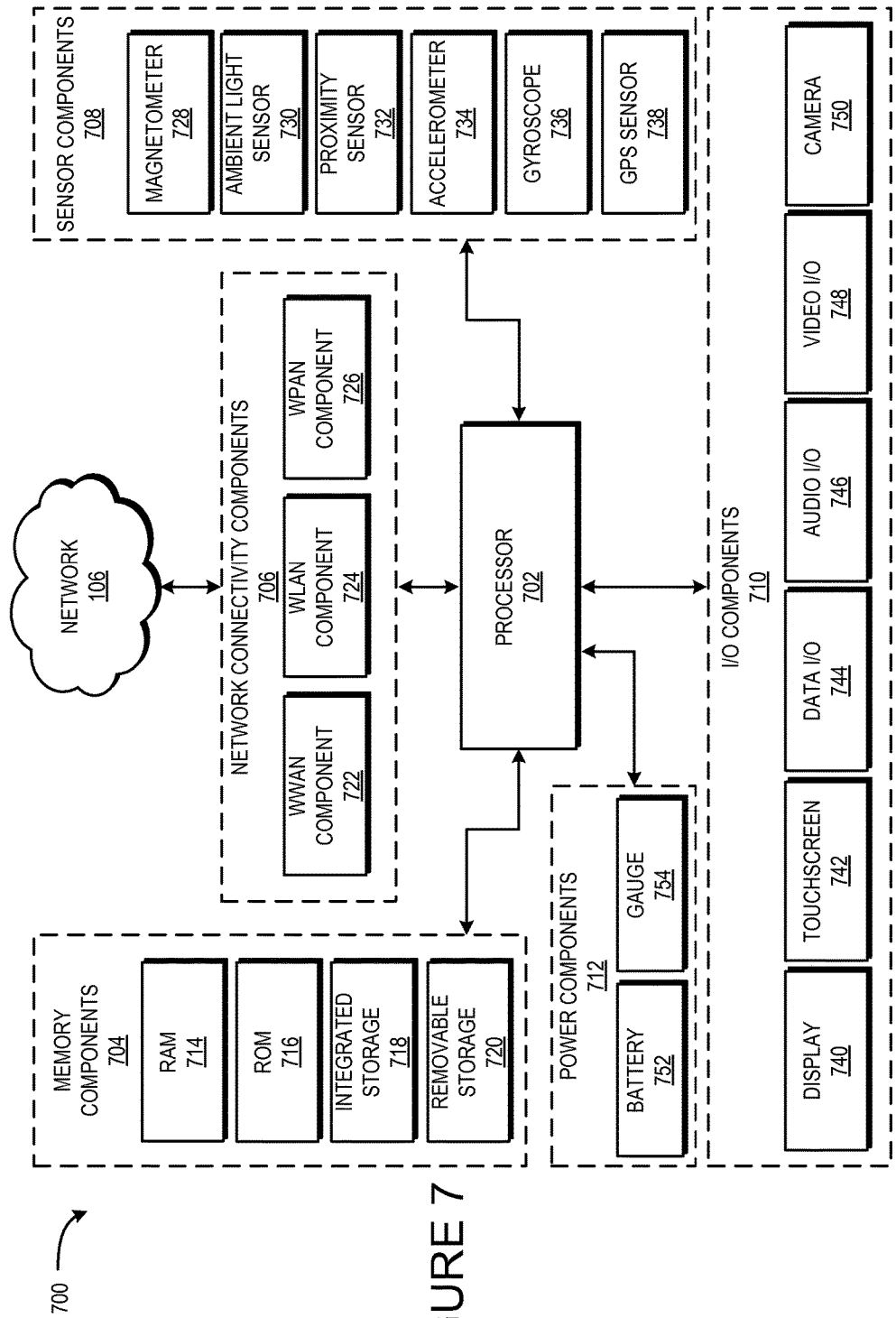
FIG. 7 is a computer architecture diagram illustrating a computing device architecture capable of implementing aspects of the embodiments presented herein.

Turning now to FIG. 7, FIG. 7 is an illustrative computing device architecture 700 for a computing device that is capable of executing various software components described herein to mine temporal patterns using parallel operations and symbolic execution. The computing device architecture 700 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 700 is applicable to any of the clients 606 shown in FIG. 6. Furthermore, aspects of the computing device architecture 700 may be applicable to traditional desktop computers, portable computers (e.g., laptops, notebooks, ultra-portables, and netbooks), server computers, and other computer systems, such as described herein with reference to FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In some examples, the processor 702 may be a multi-core processor. In the illustrated embodiment, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some embodiments, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some embodiments, the processor 702 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720p, 1080p, and greater), video games, 3D modeling applications, and the like. In some embodiments, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some embodiments, the processor 702 is fabricated, in part, utilizing a package-on-package ("PoP") integrated circuit packaging technique. Moreover, the processor 702 may be multiple processors, one or more processors with a single core, one or more processors having multiple cores, or combinations thereof.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some embodiments, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some embodiments, the RAM 714 or a portion thereof, the ROM 716 or a portion thereof, and/or some combination the RAM 714 and the ROM 716 is integrated in the processor 702. In some embodiments, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some embodiments, the removable storage 720 is provided in lieu of the integrated storage 718. In other embodiments, the removable storage 720 is provided as additional optional storage. In some embodiments, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which may be a WWAN, a WLAN, or a WPAN. Although a single network 728 is illustrated, the network connectivity components 706 may facilitate simultaneous communication with multiple networks. For example, the network connectivity components 706 may facilitate simultaneous communications with multiple networks via one or more of a WWAN, a WLAN, or a WPAN.

In some embodiments, the functionality of the network 728 is provided by one or more of the networks 104, 804. In some embodiments, the network 728 includes one or more of the networks 104, 804. In some other embodiments, the network 728 provides access to one or more of the networks 104, 804.

The network 728 may be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 728 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 may be configured to provide voice and/or data communications with any combination of the above technologies. The network 728 may be configured to or adapted to provide voice and/or data communications in accordance with future generation technologies.

In some embodiments, the WWAN component 722 is configured to provide dual-multi-mode connectivity to the network 728. For example, the WWAN component 722 may be configured to provide connectivity to the network 728, wherein the network 728 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 728 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 724 is configured to connect to the network 728 via the WI-FI access points. Such connections may be secured via various encryption technologies including, but not limited, WI-FI Protected Access ("WPA"), WPA2, Wired Equivalent Privacy ("WEP"), and the like.

The network 728 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to, temperature sensors or shock detection sensors, also may be incorporated in the computing device architecture 700.

The magnetometer 730 is configured to measure the strength and direction of a magnetic field. In some embodiments the magnetometer 730 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 730 are contemplated.

The ambient light sensor 732 is configured to measure ambient light. In some embodiments, the ambient light sensor 732 provides measurements to an application program stored within one the memory components 704 in order to automatically adjust the brightness of a display (described below) to compensate for low-light and high-light environments. Other uses of measurements obtained by the ambient light sensor 732 are contemplated.

The proximity sensor 734 is configured to detect the presence of an object or thing in proximity to the computing device without direct contact. In some embodiments, the proximity sensor 734 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 734 are contemplated.

The accelerometer 736 is configured to measure proper acceleration. In some embodiments, output from the accelerometer 736 is used by an application program as an input mechanism to control some functionality of the application program. For example, the application program may be a video game in which a character, a portion thereof, or an object is moved or otherwise manipulated in response to input received via the accelerometer 736. In some embodiments, output from the accelerometer 736 is provided to an application program for use in switching between landscape and portrait modes, calculating coordinate acceleration, or detecting a fall. Other uses of the accelerometer 736 are contemplated.

The gyroscope 738 is configured to measure and maintain orientation. In some embodiments, output from the gyroscope 738 is used by an application program as an input mechanism to control some functionality of the application program. For example, the gyroscope 738 can be used for accurate recognition of movement within a 3D environment of a video game application or some other application. In some embodiments, an application program utilizes output from the gyroscope 738 and the accelerometer 736 to enhance control of some functionality of the application program. Other uses of the gyroscope 738 are contemplated.

The GPS sensor 740 is configured to receive signals from GPS satellites for use in calculating a location. The location calculated by the GPS sensor 740 may be used by any application program that requires or benefits from location information. For example, the location calculated by the GPS sensor 740 may be used with a navigation application program to provide directions from the location to a destination or directions from the destination to the location. Moreover, the GPS sensor 740 may be used to provide location information to an external location-based service, such as E911 service. The GPS sensor 740 may obtain location information generated via WI-FI, WIMAX, and/or cellular triangulation techniques utilizing one or more of the network connectivity components 706 to aid the GPS sensor 740 in obtaining a location fix. The GPS sensor 740 may also be used in Assisted GPS ("A-GPS") systems.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some embodiments, the display 742 and the touchscreen 744 are combined. In some embodiments two or more of the data I/O component 746, the audio I/O component 748, and the video I/O component 750 are combined. The I/O components 710 may include discrete processors configured to support the various interface described below, or may include processing functionality built-in to the processor 702.

The display 742 is an output device configured to present information in a visual form. In particular, the display 742 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 742 is a liquid crystal display ("LCD") utilizing any active or passive matrix technology and any backlighting technology (if used). In some embodiments, the display 742 is an organic light emitting diode ("OLED") display. Other display types are contemplated.

The touchscreen 744 is an input device configured to detect the presence and location of a touch. The touchscreen 744 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 744 is incorporated on top of the display 742 as a transparent layer to enable a user to use one or more touches to interact with objects or other information presented on the display 742. In other embodiments, the touchscreen 744 is a touch pad incorporated on a surface of the computing device that does not include the display 742. For example, the computing device may have a touchscreen incorporated on top of the display 742 and a touch pad on a surface opposite the display 742.

In some embodiments, the touchscreen 744 is a single-touch touchscreen. In other embodiments, the touchscreen 744 is a multi-touch touchscreen. In some embodiments, the touchscreen 744 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 744. As such, a developer may create gestures that are specific to a particular application program.

In some embodiments, the touchscreen 744 supports a tap gesture in which a user taps the touchscreen 744 once on an item presented on the display 742. The tap gesture may be used for various reasons including, but not limited to, opening or launching whatever the user taps. In some embodiments, the touchscreen 744 supports a double tap gesture in which a user taps the touchscreen 744 twice on an item presented on the display 742. The double tap gesture may be used for various reasons including, but not limited to, zooming in or zooming out in stages. In some embodiments, the touchscreen 744 supports a tap and hold gesture in which a user taps the touchscreen 744 and maintains contact for at least a pre-defined time. The tap and hold gesture may be used for various reasons including, but not limited to, opening a context-specific menu.

In some embodiments, the touchscreen 744 supports a pan gesture in which a user places a finger on the touchscreen 744 and maintains contact with the touchscreen 744 while moving the finger on the touchscreen 744. The pan gesture may be used for various reasons including, but not limited to, moving through screens, images, or menus at a controlled rate. Multiple finger pan gestures are also contemplated. In some embodiments, the touchscreen 744 supports a flick gesture in which a user swipes a finger in the direction the user wants the screen to move. The flick gesture may be used for various reasons including, but not limited to, scrolling horizontally or vertically through menus or pages. In some embodiments, the touchscreen 744 supports a pinch and stretch gesture in which a user makes a pinching motion with two fingers (e.g., thumb and forefinger) on the touchscreen 744 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 744. As such, the above gestures should be understood as being illustrative and should not be construed as being limiting in any way.

The data I/O interface component 746 is configured to facilitate input of data to the computing device and output of data from the computing device. In some embodiments, the data I/O interface component 746 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 748 is configured to provide audio input and/or output capabilities to the computing device. In some embodiments, the audio I/O interface component 746 includes a microphone configured to collect audio signals. In some embodiments, the audio I/O interface component 746 includes a headphone jack configured to provide connectivity for headphones or other external speakers. In some embodiments, the audio interface component 748 includes a speaker for the output of audio signals. In some embodiments, the audio I/O interface component 746 includes an optical audio cable out.

The video I/O interface component 750 is configured to provide video input and/or output capabilities to the computing device. In some embodiments, the video I/O interface component 750 includes a video connector configured to receive video as input from another device (e.g., a video media player such as a DVD or BLURAY player) or send video as output to another device (e.g., a monitor, a television, or some other external display). In some embodiments, the video I/O interface component 750 includes a High-Definition Multimedia Interface ("HDMI"), mini-HDMI, micro-HDMI, DisplayPort, or proprietary connector to input/output video content. In some embodiments, the video I/O interface component 750 or portions thereof is combined with the audio I/O interface component 748 or portions thereof.

The camera 752 can be configured to capture still images and/or video. The camera 752 may utilize a charge coupled device ("CCD") or a complementary metal oxide semiconductor ("CMOS") image sensor to capture images. In some embodiments, the camera 752 includes a flash to aid in taking pictures in low-light environments. Settings for the camera 752 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 754, which can be connected to a battery gauge 756. The batteries 754 may be rechargeable or disposable. Rechargeable battery types include, but are not limited to, lithium polymer, lithium ion, nickel cadmium, and nickel metal hydride. Each of the batteries 754 may be made of one or more cells.

The battery gauge 756 can be configured to measure battery parameters such as current, voltage, and temperature. In some embodiments, the battery gauge 756 is configured to measure the effect of a battery's discharge rate, temperature, age and other factors to predict remaining life within a certain percentage of error. In some embodiments, the battery gauge 756 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via a power I/O component 744.

Example Clauses

A. A computer-implemented method for mining data, the method comprising: receiving temporal data; reducing the temporal data to a plurality of data sub-portions comprising dependencies within the plurality of data sub-portions; applying a symbolic state to the plurality of the data sub-portions; computing a summary for the plurality of the data sub-portions in a symbolic state in parallel; and reducing the summaries for the plurality of the data sub-portions to determine a sequential output.

B. The computer-implemented method as paragraph A recites, wherein applying a symbolic state to the plurality of the data sub-portions comprises using a symbolic data type.

C. The computer-implemented method as either paragraph A or B recites, wherein the symbolic data type is a write-only data type that stores a value from a domain, wherein the final value of the stored value is generated when reducing all of the summaries for the plurality of the data sub-portions to determine a sequential output.

D. The computer-implemented method as any of paragraphs A-C recites, wherein the symbolic data type is a predicate data type that stores a single value from a domain, and allows an arbitrary set of predicates that compare a currently stored value with a new value that is defined based on the currently stored value and the new value being accepted by a specified predicate.

E. The computer-implemented method as any of paragraphs A-D recites, wherein the symbolic data type is an integer with constraints that allows arithmetic operations on a single integer to represent a current value as a function of an initial symbolic value.

F. The computer-implemented method as any of paragraphs A-E recites, wherein the symbolic data type may be tuples comprised of one or more symbolic data types.

G. The computer-implemented method as any of paragraphs A-F recites, wherein applying a symbolic state to the plurality of the data sub-portions is modeled as an extended finite state machine that uses symbolic summaries when reducing the temporal data to a plurality of data sub-portions.

H. The computer-implemented method as any of paragraphs A-G recites, further comprising receiving an analysis query to determine buying patterns consumers.

I. The computer-implemented method as any of paragraphs A-H recites, wherein reducing the temporal data to a plurality of data sub-portions comprising dependencies within the plurality of data sub-portions is performed using a groupby function.

J. The computer-implemented method as any of paragraphs A-I recites, wherein the groupby function splits the data into sessions.

K. A computer-readable medium including computer-executable instructions to perform a method as any of paragraphs A-J recites.

L. A computer-readable storage medium having computer-executable instructions stored thereupon which, when executed by one or more processors, cause the one or more processors to: receive temporal data; execute a groupby function to split the temporal data into sessions, wherein at least one of the sessions comprises dependencies on another session; execute an update function in a symbolic state and perform computations on the sessions in parallel to generate summaries for each of the sessions; and reduce the summaries to determine a sequential output.

M. The computer-readable storage medium as paragraph L recites, wherein the symbolic state comprises a symbolic data type.

N. The computer-readable storage medium as paragraphs L and M recites, wherein the symbolic data type is a write-only data type that stores a value from a domain, wherein the final value of the stored value is generated when reducing all of the summaries for each of the data sub-portions to determine a sequential output.

O. The computer-readable storage medium as any of paragraphs L-N recites, wherein the symbolic data type is a predicate data type that stores a single value from a domain, and allows an arbitrary set of predicates that compare a currently stored value with a new value that is defined based on the currently stored value and the new value being accepted by a specified predicate.

P. The computer-readable storage medium as any of paragraphs L-O recites, wherein the symbolic data type is an integer with constraints that allows basic arithmetic operations on a single integer to represent a current value as a simple function of an initial symbolic value.

Q. The computer-readable storage medium as any of paragraphs L-P recites, wherein the symbolic data type may be a tuple comprised of one or more symbolic data types.

R. The computer-readable storage medium as any of paragraphs L-R recites, wherein execute an update function in a symbolic state and perform computations on the sessions in parallel to generate summaries for each of the sessions is modeled as an extended finite state machine that uses symbolic summaries when reducing the temporal data to a plurality of data sub-portions.

S. A computing system, the computing system comprising: a processor; and a computer-readable storage medium having computer-executable instructions stored thereupon which, when executed on the processor, cause the processor to receive temporal data comprised of a plurality of sessions, wherein at least one of the sessions comprises a dependency on another session; reduce the temporal data to a plurality of data sub-portions, wherein each of the plurality of data sub-portions comprises one or more of the sessions; apply a symbolic state to each of the data sub-portions; compute a summary for each of the data sub-portions in a symbolic state in parallel; and reduce the summaries for each of the data sub-portions to determine a sequential output.

T. The system as paragraph S recites, wherein applying a symbolic state comprises a symbolic data type.

U. The system as any of paragraph S or T recites, wherein the symbolic data type is a write-only data type that stores a value from a domain, wherein the final value of the stored value is generated when reducing all of the summaries for each of the data sub-portions to determine a sequential output, wherein the symbolic data type is a predicate data type that stores a single value from a domain, but allows an arbitrary set of predicates that compare a currently stored value with a new value that is defined if the currently stored value and the new value are accepted by a specified predicate, or wherein the data type is an integer with constraints that allows basic arithmetic operations on a single integer to represent a current value as a simple function of an initial symbolic value.

Based on the foregoing, it should be appreciated that technologies for mining temporal patterns in data have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for improving the efficiency of mining data, the method comprising:
   receiving temporal data including data associated with a time;
   reducing the temporal data to a plurality of data sub-portions, at least one data sub-portion of the plurality of data sub-portions comprising temporal dependencies on another data sub-portion of the plurality of data sub-portions;
   applying a symbolic state to the plurality of the data sub-portions using a symbolic data type, wherein the symbolic data type includes a value, a set of operations to be performed on the value, and a partial function that defines a new value for the symbolic data type when performing an operation of the set of operations;
   computing a summary for the plurality of the data sub-portions in a symbolic state in parallel, each summary computing a plurality of possible final states for a plurality of possible start states for a data sub-portion of the plurality of the data sub-portions in the symbolic state, thereby improving the efficiency of mining data through parallel computation; and
   reducing the summaries for the plurality of the data sub-portions to determine a sequential output.

2. The computer-implemented method of claim 1, wherein the symbolic data type is a write-only data type that stores a value from a domain, wherein a final value of a stored value is generated when reducing all of the summaries for the plurality of the data sub-portions to determine a sequential output.

3. The computer-implemented method of claim 1, wherein the symbolic data type is a predicate data type that stores a single value from a domain, and allows an arbitrary set of predicates that compare a currently stored value with a new value that is defined based on the currently stored value and the new value being accepted by a specified predicate.

4. The computer-implemented method of claim 1, wherein the symbolic data type is an integer with constraints that allows arithmetic operations on a single integer to represent a current value as a function of an initial symbolic value.

5. The computer-implemented method of claim 1, wherein the symbolic data type may be tuples comprised of one or more symbolic data types.

6. The computer-implemented method of claim 1, wherein applying a symbolic state to the plurality of the data sub-portions is modeled as an extended finite state machine that uses symbolic summaries when reducing the temporal data to a plurality of data sub-portions.

7. The computer-implemented method of claim 1, further comprising receiving an analysis query to determine buying patterns consumers.

8. The computer-implemented method of claim 1, wherein reducing the temporal data to a plurality of data sub-portions comprising dependencies within the plurality of data sub-portions is performed using a groupby function.

9. The computer-implemented method of claim 8, wherein the groupby function splits the data into sessions.

10. A computer-readable storage device having computer-executable instructions stored thereupon which, when executed by one or more processors, cause the one or more processors to execute a method for improving the efficiency of mining data comprising:
    receiving temporal data including data associated with a time;
    executing a groupby function to split the temporal data into a plurality of sessions, wherein at least one of the sessions of the plurality of sessions comprises temporal dependencies on another session of the plurality of sessions;
    executing an update function in a symbolic state to the plurality of sessions using a symbolic data type, wherein the symbolic data type includes a value, a set of operations to be performed on the value, and a partial function that defines a new value for the symbolic data type when performing an operation of the set of operations;
    generating summaries for each of the sessions in a symbolic state in parallel, each summary computing a plurality of possible final states for a plurality of possible start states for a session of the plurality of the plurality of sessions in the symbolic state, thereby improving the efficiency of mining data through parallel computation; and
    reducing the summaries to determine a sequential output.

11. The computer-readable storage device of claim 10, wherein the symbolic data type is a write-only data type that stores a value from a domain, wherein a final value of a stored value is generated when reducing all of the summaries for each of the sessions to determine a sequential output.

12. The computer-readable storage device of claim 10, wherein the symbolic data type is a predicate data type that stores a single value from a domain, and allows an arbitrary set of predicates that compare a currently stored value with a new value that is defined based on the currently stored value and the new value being accepted by a specified predicate.

13. The computer-readable storage medium of claim 10, wherein the symbolic data type is an integer with constraints that allows basic arithmetic operations on a single integer to represent a current value as a simple function of an initial symbolic value.

14. The computer-readable storage device of claim 10, wherein the symbolic data type may be a tuple comprised of one or more symbolic data types.

15. The computer-readable storage device of claim 10, wherein executing the update function in the symbolic state and generating summaries for each of the sessions is modeled as an extended finite state machine that uses symbolic summaries when executing the groupby function to split the temporal data into the plurality of sessions.

16. A computing system, the computing system comprising:
    a processor; and
    a computer-readable storage device having computer-executable instructions stored thereupon which, when executed on the processor, cause the processor to:
      receive temporal data including data associated with a time and comprised of a plurality of sessions, wherein at least one of the sessions of the plurality of sessions comprises a temporal dependency on another session of the plurality of sessions;
      reduce the temporal data to a plurality of data sub-portions, wherein each of the plurality of data sub-portions comprises one or more of the sessions of the plurality of sessions;

apply a symbolic state to each of the data sub-portions using a symbolic data type, wherein the symbolic data type includes a value, a set of operations to be performed on the value, and a partial function that defines a new value for the symbolic data type when performing an operation of the set of operations;

compute a summary for each of the data sub-portions in a symbolic state in parallel, each summary computing a plurality of possible final states for a plurality of possible start states for a data sub-portion of the plurality of the data sub-portions in the symbolic state, thereby improving the efficiency of mining data through parallel computation; and reduce the summaries for each of the data sub-portions to determine a sequential output.

17. The system of claim of claim 16, wherein the symbolic data type is a write-only data type that stores a value from a domain, wherein the final value of the stored value is generated when reducing all of the summaries for each of the data sub-portions to determine a sequential output.

18. The system of claim of claim 16, wherein the symbolic data type is a predicate data type that stores a single value from a domain, but allows an arbitrary set of predicates that compare a currently stored value with a new value that is defined if the currently stored value and the new value are accepted by a specified predicate.

19. The system of claim of claim 16, wherein the data type is an integer with constraints that allows basic arithmetic operations on a single integer to represent a current value as a simple function of an initial symbolic value.

20. The system of claim of claim 16, wherein reducing the temporal data to the plurality of data sub-portions is performed using a groupby function.

* * * * *